J. C. BARLOW.
Seed-Planters.
No. 154,633. Patented Sept. 1, 1874.
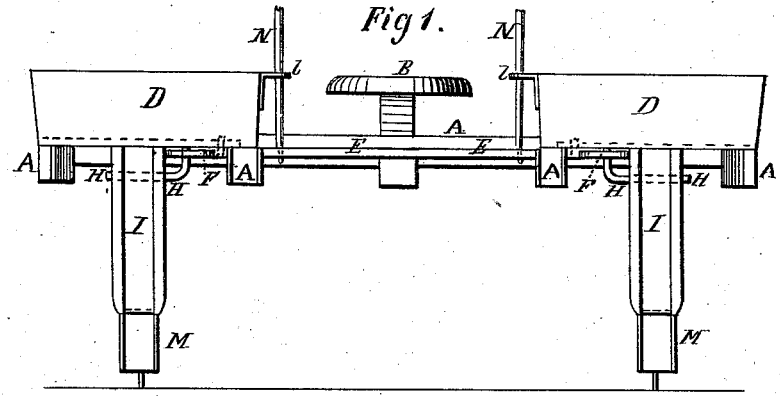
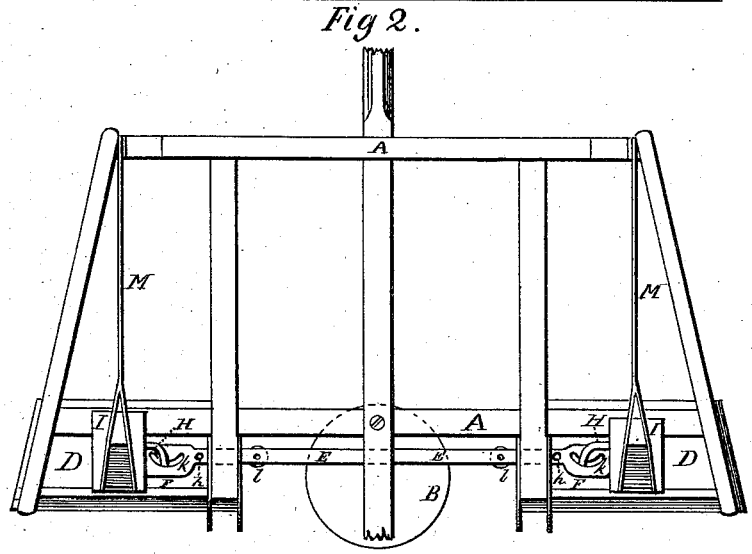
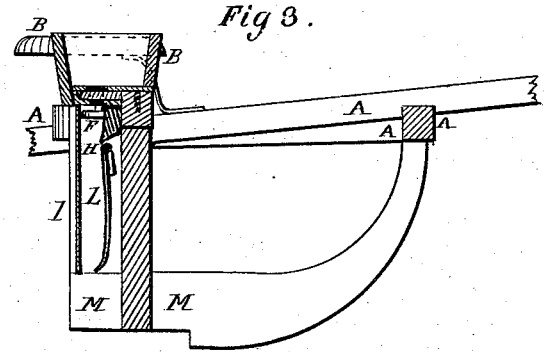
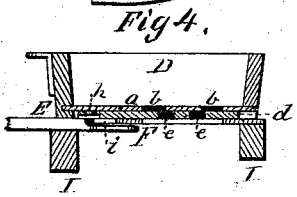
Witnesses:
J. P. Theodore Lang.
Dennis Finney
Inventor:
Joseph C. Barlow
by his attys.
Cox & Cox

UNITED STATES PATENT OFFICE.

JOSEPH C. BARLOW, OF QUINCY, ILLINOIS, ASSIGNOR TO THE VANDIVER CORN-PLANTER COMPANY, OF SAME PLACE.

IMPROVEMENT IN SEED-PLANTERS.

Specification forming part of Letters Patent No. 154,633, dated September 1, 1874; application filed August 18, 1874.

*To all whom it may concern:*

Be it known that I, JOSEPH C. BARLOW, of Quincy, Illinois, have invented certain new and useful Improvements in Dropping-Valves for Seed-Planters, of which the following is a specification, reference being had to the accompanying drawings.

The invention relates to an improvement in dropping-valves for seed-planters, being especially adapted to machines for planting corn; and consists in a horizontal connecting-rod operated by a vertical lever standing in convenient reach of the operator's seat, the rod passing under the hopper on each side, below which it is provided with a plate having a curved or inclined slot, in which operates one end of a crank rock-shaft, the lower parts of which traverse the seed-tube and are attached near the upper end of the valve, forming the axle upon which it vibrates, the lower end of the valve being arranged to project beyond the vertical plane of its upper portions, and thus bring its lower edge in contact with one side of the seed-tube. The object of the invention is to provide a seed-valve having a positive movement and operated by a slotted plate and rock-shaft in such manner that at each half-stroke of the lever the valve is opened and closed, while a movement of the lever of less than a quarter-stroke opens the valve so as to drop the charge of seed which has descended from the hopper, thus enabling the operator to deposit the seed instantly upon the check-row by a very slight movement of the lever.

Figure 1 is a rear elevation of a device embodying the elements of the invention. Fig. 2 is a bottom view of same. Fig. 3 is a vertical section of same through one side of the hopper D. Fig. 4 is a longitudinal section of one of the hoppers and its attachments.

A in the accompanying drawings is the frame of a riding-planter, to which, upon each side of the operator's seat B, are properly placed the hoppers D, of usual construction, having within them the plates a, provided with the apertures b, properly placed with relation to the seed-tube. Below the plates a are placed the slides d, having the apertures e properly placed with relation to the apertures b. The slides d are connected by a bolt, h, which passes through the slot i in the bottom of the hopper D, with the connecting-rod E, which extends across the device and is provided at each end with the plate F, having at its center the arched slot k, in which is placed the upper end of the crank rock-shaft H, the rod E being arranged so as to be moved laterally. From the point where the upper end of the rock-shaft H enters the slot k, it depends vertically a suitable distance, and is then bent to a right angle, its horizontal portions passing through and having bearings in the sides of the seed-tube I, near the upper part thereof. To the portion of the rock-shaft H within the seed-tube is rigidly secured the upper end of the valve L, so hung that the seed can pass from the hopper only on one side of it, and extending from the base to near the top of the tube, the lower part of it being curved rearward in such manner that, as the rock-shaft is operated, the lower edge of the valve shall come in contact with the inner surface of the rear side of the tube, so as to retain the seed when in impact therewith. The valve is thus suspended by the rock-shaft in the seed-tube as upon an axle. The base of the tube is in close relation to the cleft in the runner M, so that the charge shall fall into the furrow made by the runner.

If desired, the rear side of the tube may, as in the present instance, be made of glass, so as to enable the operator to perceive the opertion of the valve.

The inner edge of the hopper D is provided with the loops l, through which passes the lever N, the lower end of which is properly secured to the connecting-rod E, by which means the rod may be moved laterally.

The hoppers D being properly supplied with seed, the movement of the lever N to the extent of one half stroke operates the slide d, conveying a charge of seed to the mouth of the seed-tube I, down which it falls, and is caught between the lower edge of the valve L and the side of the tube. The movement of the lever in the reverse direction to the extent of less than a quarter stroke operates the rod E, which brings the sides of the slot $k$ in the plate F against the rock-shaft H, turning it, and thus opening the valve L, dropping the charge in the furrow.

Thus every half-stroke deposits a charge of seed in the tube, which charge is dropped by less than a quarter-stroke in the opposite direction; hence, the operation of filling the tube and dropping the charge is performed in less than three-fourths of a full stroke.

It is obvious that the movement of the valve L is wholly regulated by the conformation of the slot $k$ in the plate F. Thus, according as this slot is of greater or less radius, so the movement of the valve will be, respectively, slower or more rapid. Hence, a very slight movement of the lever suffices to open the valve, and so the seed may be instantly dropped on the check-row.

The opening or spread of the lower end of the valve may be increased or diminished according as that part of the rock-shaft to which the valve is attached be placed nearer or farther from the upper end of the valve.

What I claim as my invention, and desire to secure by Letters Patent, is—

1. In a corn-planter, the plate F, provided with the curved slot $k$, in combination with the pivoted valve L, as and for the uses and purposes shown and specified.

2. The combination of the lever N, connecting-rod E, slotted plate F, crank rock-shaft H, valve L, and seed-tube I, substantially as shown and described.

In testimony that I claim the foregoing improvements in dropping-valves for seed-planters, as above described, I have hereunto set my hand and seal this 18th day of August, 1874.

JOSEPH C. BARLOW. [L. S.]

Witnesses:
    HARRY COX,
    S. M. POOL.